United States Patent
Radhakrishnan et al.

(10) Patent No.: US 7,996,626 B2
(45) Date of Patent: Aug. 9, 2011

(54) SNOOP FILTER OPTIMIZATION

(75) Inventors: Ramesh Radhakrishnan, Austin, TX (US); Arun Rajan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 209 days.

(21) Appl. No.: 11/955,537

(22) Filed: Dec. 13, 2007

(65) Prior Publication Data

US 2009/0158022 A1 Jun. 18, 2009

(51) Int. Cl.
*G06F 13/28* (2006.01)

(52) U.S. Cl. .......... 711/146; 711/137; 711/141; 710/18; 710/107

(58) Field of Classification Search ............. 710/18, 710/107; 711/141, 146, 137
See application file for complete search history.

(56) References Cited

U.S. PATENT DOCUMENTS

| | | | |
|---|---|---|---|
| 5,426,741 A * | 6/1995 | Butts et al. ............. 710/18 |
| 5,966,729 A | 10/1999 | Phelps | |
| 6,304,945 B1 | 10/2001 | Koenen | |
| 6,401,156 B1 * | 6/2002 | Mergard et al. ......... 710/266 |
| 6,519,685 B1 | 2/2003 | Chang | |
| 6,598,123 B1 | 7/2003 | Anderson et al. | |
| 6,615,319 B2 | 9/2003 | Khare et al. | |
| 6,694,409 B2 | 2/2004 | Chang | |
| 6,704,845 B2 | 3/2004 | Anderson et al. | |
| 6,725,337 B1 | 4/2004 | Tan et al. | |
| 6,810,467 B1 | 10/2004 | Khare et al. | |
| 6,829,665 B2 | 12/2004 | Jones et al. | |
| 6,842,827 B2 | 1/2005 | Blankenship et al. | |
| 6,842,830 B2 | 1/2005 | Khare et al. | |
| 6,857,048 B2 | 2/2005 | Rankin et al. | |
| 6,859,864 B2 | 2/2005 | Khare et al. | |
| 6,959,364 B2 | 10/2005 | Safranek et al. | |
| 6,961,800 B2 | 11/2005 | Lester et al. | |
| 7,076,539 B2 * | 7/2006 | Reese et al. ............. 709/222 |
| 7,093,079 B2 * | 8/2006 | Quach et al. ............. 711/141 |
| 7,117,311 B1 * | 10/2006 | Rankin et al. ............. 711/146 |
| 7,117,312 B1 * | 10/2006 | Cypher ............. 711/146 |
| 7,173,450 B2 * | 2/2007 | Atkinson ............. 326/30 |
| 7,386,683 B2 * | 6/2008 | Blumrich et al. ............. 711/146 |
| 7,392,351 B2 * | 6/2008 | Blumrich et al. ............. 711/146 |
| 7,581,068 B2 * | 8/2009 | Gilbert et al. ............. 711/146 |
| 2007/0079074 A1 * | 4/2007 | Collier et al. ............. 711/141 |

OTHER PUBLICATIONS

Salapura et al. Design and Implementation of the Blue Gene/P Snoop Filter. IBM Corporation. Feb. 18, 2008.*

Blumrich et al. Exploring the Architecture of a Stream Register-Based Snoop Filter. Springer-Verlag Berlin Heidelberg. 2011.*

Zhou et al. Application-Aware Snoop Filtering for Low-Power Cache Coherence in Embedded Microprocessors. ACM Transactions on Design Automation of Electronic Systems. vol. 13. No. 1. Article 16. Jan. 2008.*

Rizwan Ali; Baris Guler; Ramesh Radhakrishnan, Ph.D; and Vishvesh Sahasrabudhe; Feature Section: New Generation Servers And Storage, Configuring Ninth-Generation Dell PowerEdge Servers For High-Performance Computing Environments; 2006; p. 35-p. 38; Dell Inc.; www.dell.com/powersolutions.

* cited by examiner

*Primary Examiner* — Matthew D Spittle

(74) *Attorney, Agent, or Firm* — Haynes and Boone, LLP

(57) ABSTRACT

A snoop filter optimization system includes one or more subsystems to operate a snoop filter, determine information that that affects operation of the snoop filter, and adjust operation of the snoop filter relative to the information that affects operation of the snoop filter.

21 Claims, 4 Drawing Sheets

SNOOP FILTER OPTIMIZATION

BACKGROUND

The present disclosure relates generally to information handling systems (IHSs), and more particularly to IHS snoop filter optimization.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHS server and workstation chipsets use snoop-filter caches (SF Caches) to reduce the percentage of cache line snoops on a remote bus, to improve performance. The snoop filter cache stores a directory of all processor cache lines to minimize snoop traffic on the dual front-side buses during a cache miss.

In theory, a snoop filter ensures that snoop requests for cache lines go to the appropriate processor bus (e.g., on a system with multiple front side busses (FSBs)) and not all of the available busses, thereby improving performance. Therefore, applications will benefit from a reduced snoop activity that the snoop filter cache provides.

Experiments have shown that a snoop filter does not improve performance for all applications, and moreover its performance impact is sensitive to the system configuration. In many cases, the snoop filter can cause performance degradation for certain workloads.

Accordingly, it would be desirable to provide a static and dynamic optimization of a snoop filter to optimize performance of systems with a snoop filter cache, absent the deficiencies described above.

SUMMARY

According to one embodiment, a snoop filter optimization system includes one or more subsystems to operate a snoop filter, determine information that that affects operation of the snoop filter, and adjust operation of the snoop filter relative to the information that affects operation of the snoop filter.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, and one or more network ports for communicating with external devices as well as various input and output (I/O) devices, such as a keyboard, a mouse, and a video display. The IHS 100 may also include one or more buses operable to transmit communications between the various hardware components.

Figure 1:
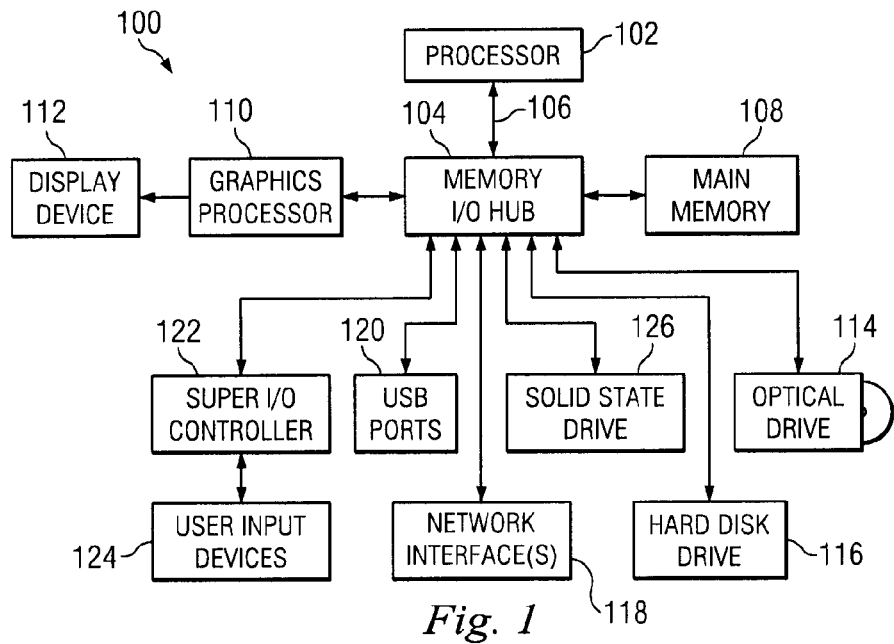
FIG. 1 illustrates an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components. For example, the processor 102 and the memory I/O hub 104 can be combined together. As can be appreciated, many systems are expandable, and include or can include a variety of components, including redundant or parallel resources.

Figure 2:
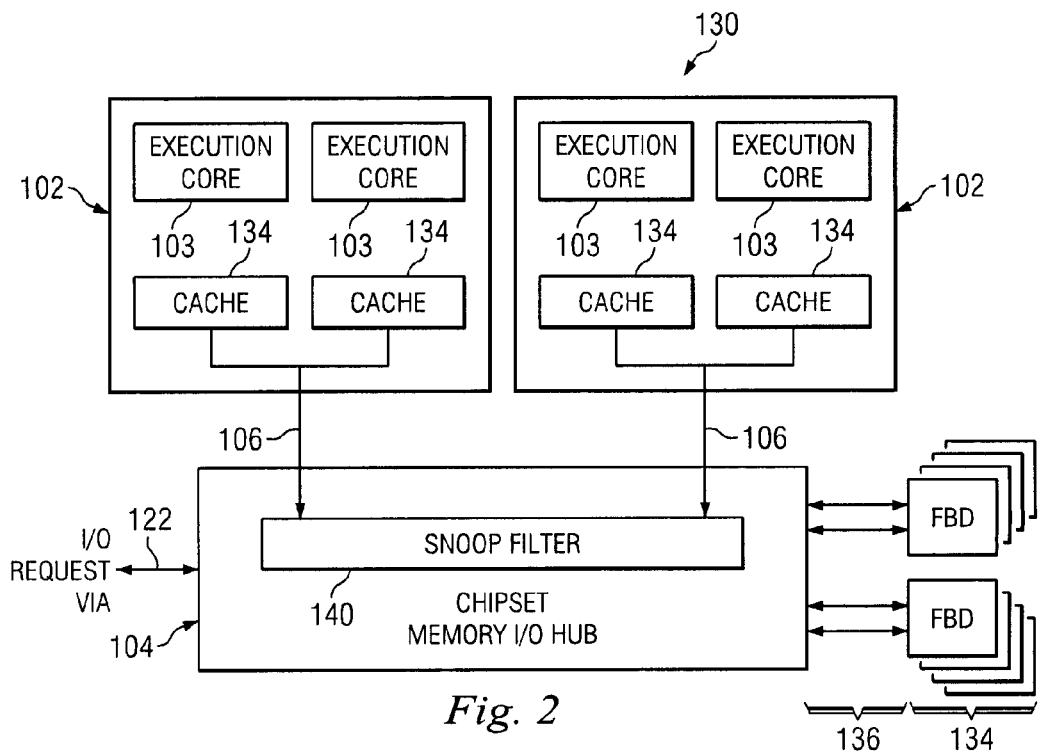
FIG. 2 illustrates an embodiment of a snoop filter system.

FIG. 2 illustrates an embodiment of a snoop filter system 130. A snoop filter may also be referred to as a cache coherency filter. An issue in larger systems is effectively handling cache coherency traffic. Therefore, a snoop filter 140 may be provided to reduce cache coherency traffic by separating each bus segment into a distinct cache coherency domain, with little traffic occurring between the two. This embodiment of a snoop filter system 130 is shown having a front side bus 106 architecture however, other IHS architectures may be used as will be readily understood by those having ordinary skill in the art. In the illustrated embodiment, the snoop filter system 130 includes multiple processors 102, with each having multiple processor execution cores 103. Any number of processors 102 and any number of processor cores 103 may be used with the present disclosure.

The snoop filter system 130 includes a front side bus 106 to communicatively couple the processor 102 to the memory I/O hub chipset 104. In an embodiment, communication information/data passes through processor cache memory 134 to the memory I/O hub 140 via the front side bus or system bus 106. In an embodiment, a front side bus 106 is the primary pathway between a processor 102 and memory 108. Speed of a front side bus 106 is generally derived from the number of parallel channels (e.g., 16 bit, 32 bit, and etc.) and clock speed and is generally faster than a peripheral bus such as, PCI, ISA, and etc. As the information/data passes through the memory I/O hub 104 a snoop filter 140 determines and stores the status of the processor cache 134 lines, filters unnecessary snoops on the processor 102 and via the I/O controller 122 to any remote bus, and lowers front side bus 106 utilization. When cache memory 134 has been changed, the snoop filter 140 allows other processors 102 to check which cache memory 134 has been changed.

In an embodiment, The snoop filter system 130 also includes a plurality of memory files 134 (e.g., fully buffered dynamic random access memory (FBD)), as all or part of the main memory 108. One or more memory busses 136 couple the FBD 134 with the memory I/O hub 104 to allow communication between the FBD 134 and the memory I/O hub 104.

Figure 3:
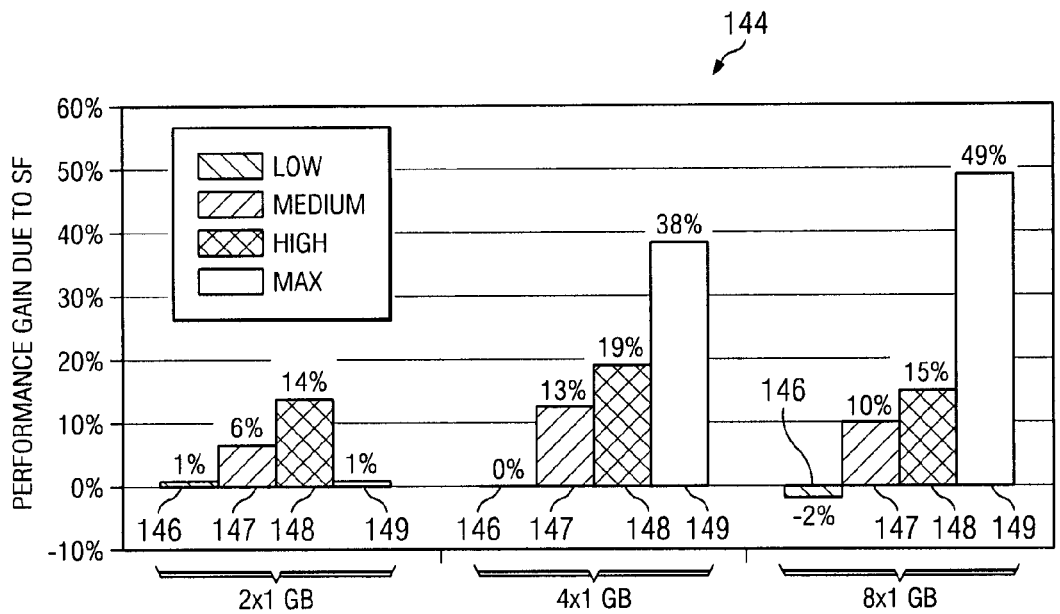
FIG. 3 is a chart illustrating impact of memory size and front side bus/memory bus utilization on snoop filter performance.

FIG. 3 is a chart 144 illustrating impact of memory size and front side bus/memory bus utilization on snoop filter performance. This chart 144 shows an improvement in measured memory latency for low (e.g., 2×1 GB), medium (e.g., 4×1 GB) and high (e.g., 8×1 GB) memory and front side bus 106 utilization or traffic at low 146, medium 147, high 148, and maximum 149 front side bus 106 utilization. As shown, the impact of the snoop filter 140 is higher at larger memory configurations and for higher front side bus 106 utilization. Therefore, it can be derived that the snoop filter 140 impact on the IHS 100 can depend on memory size and workload characteristics.

Figure 4:
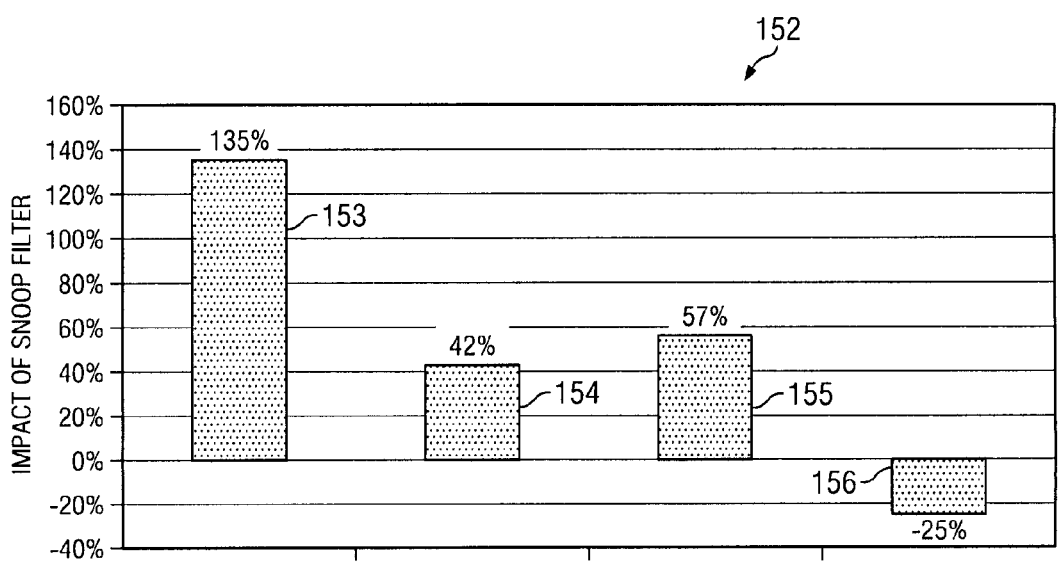
FIG. 4 is a chart illustrating impact of architectural features on snoop filter performance for different processors.

FIG. 4 is a chart 152 illustrating impact of architectural features on snoop filter 140 performance for different processors. This chart 152 shows performance improvement for different applications (e.g., application A 153, application B 154, application C 155, and application D 156) when running on an IHS 100 having the same memory I/O hub chipset 104, but running with different processors 102 (e.g., processor A and processor B). In an embodiment, processor A has a higher front side bus 106 speed and more FP operations per cycle. Thus, the gain from the snoop filter 140 is higher for this architecture.

Figure 5:
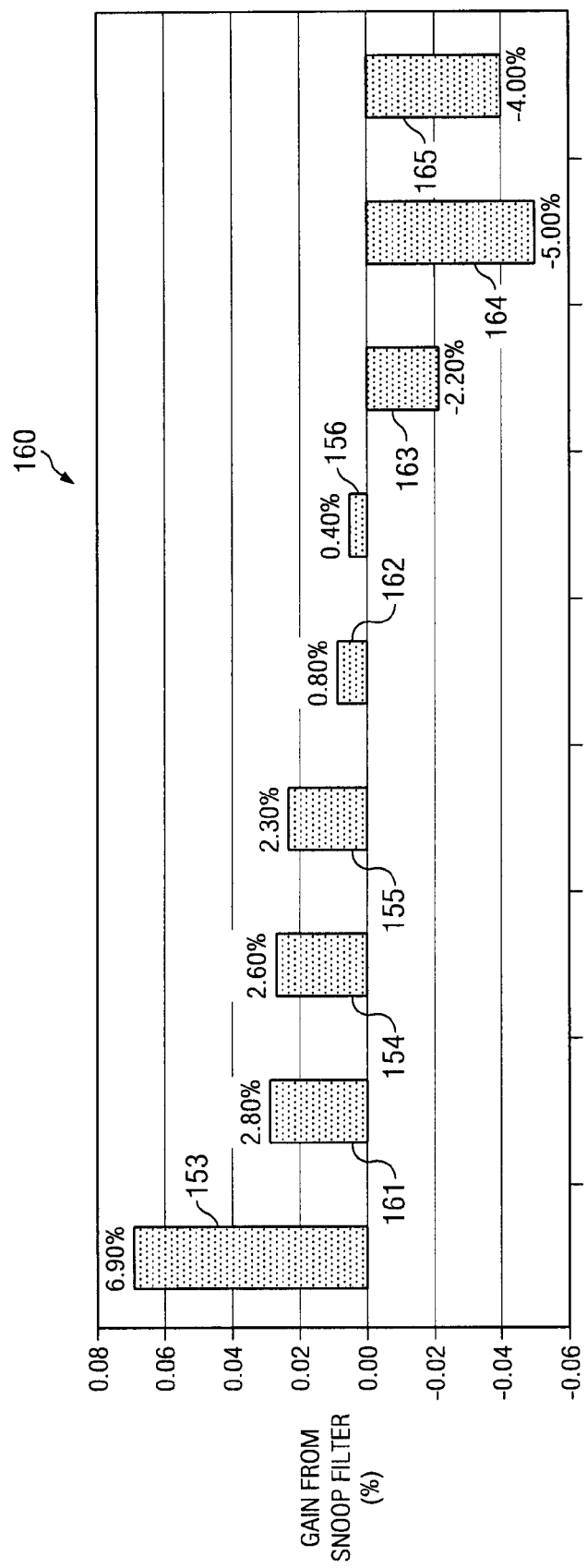
FIG. 5 is a chart illustrating impact of snoop filter across different workloads.

FIG. 5 is a chart 160 illustrating impact of a snoop filter 140 across different workloads. This chart 160 illustrates that the snoop filter 140 does not improve performance across all workloads (e.g., application A 153, application B 154, application C 155, application D 156, application E 161, application F 162, application G 163, application H 164, and application I 165). The applications 153-165 may be different programs, software, processes, and the like.

Because the impact of a snoop filter 140 is sensitive to many factors such as, workloads, memory configurations, processor 102 architecture, and a variety of other factors, the present disclosure contemplates that the snoop filter 140 operation is enabled for those scenarios in which it will be beneficial to the IHS 100 performance. Otherwise, the snoop filter 140 may be disabled for IHS 100 configurations and/or applications that may not benefit from the snoop filter 140.

Figure 6:
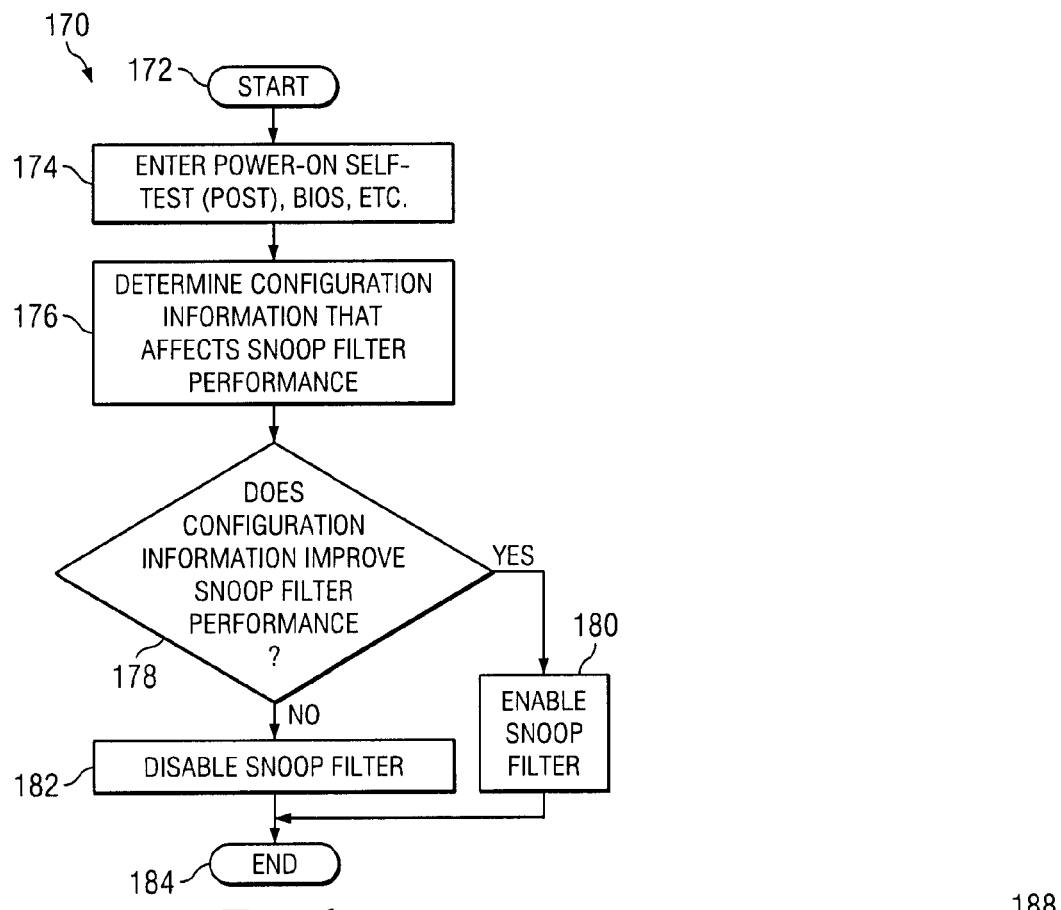
FIG. 6 is a flow chart illustrating an embodiment of a static snoop filter method.

FIG. 6 is a flow chart illustrating an embodiment of a static snoop filter method 170. The method 170 starts at block 172 when an IHS 100 is powered on or otherwise reset. However, the method 170 may start at block 172 at times other than power on or reset. The method 170 then proceeds to block 174 where the method 170 enters a power on self test (POST), basic input/output system (BIOS) operation, or other self-inquiry mode. The method 170 then proceeds to block 176 where the method 170 determines configuration information for the IHS 100 that affects snoop filter performance. The method 170 then proceeds to decision block 178 where the method 170 determines whether the configuration information of the IHS 100 improves the snoop filter 140 performance based on a pre-defined look-up table. If the method 170 determines that the IHS 100 configuration does improve the snoop filter 140 performance, the method 170 proceeds to block 180 where the method 170 enables the snoop filter 140 operation and ends at block 184. If the method 170 determines that the IHS 100 configuration does not improve the snoop filter 140 performance, the method 170 proceeds to block 182 where the method 170 disables the snoop filter 140 operation and ends at block 184.

In an embodiment, the method 170 analyzes the IHS 100 system configuration during a POST and makes a decision to enable/disable the snoop filter 140 based on a table lookup. The table may be populated with any configuration information that impacts the snoop filter 140 performance (e.g., see FIGS. 3 and 4) and is used to determine whether the snoop filter 140 should be enabled or disabled for that IHS 100. Configuration variables that may determine the usefulness of the snoop filter 140 include snoop filter 140 configuration (e.g., size and inclusiveness), processor 102 memory and front side bus 106 speeds, processor 102 cache 134 sizes, amount of system memory 108, 134, number of processors 102, IHS 100 model number (provides configuration information), workload/applications running, and/or a variety of other variables.

In an embodiment, a decision at POST may be made based on the snoop filter 140 configuration (e.g., coverage and policy) and its relationship with the processor 102's and memory configuration in the IHS 100. This helps the IHS 100 get the maximum performance from their IHS 100. For example, if the snoop filter 140 size is less than the sum of processor 102 caches 134, then the snoop filter 140 cannot provide 1× coverage. In such instances the snoop filter 140 should be turned off or otherwise disabled to reduce performance degradation due to back-invalidate operations that cause cache misses to increase. Similarly, the table lookup in the BIOS should be populated by such data when running standard benchmarks for different processor 102 and memory configurations to determine if the snoop filter 140 should be enabled or disabled if sufficient coverage is not provided.

Figure 7:
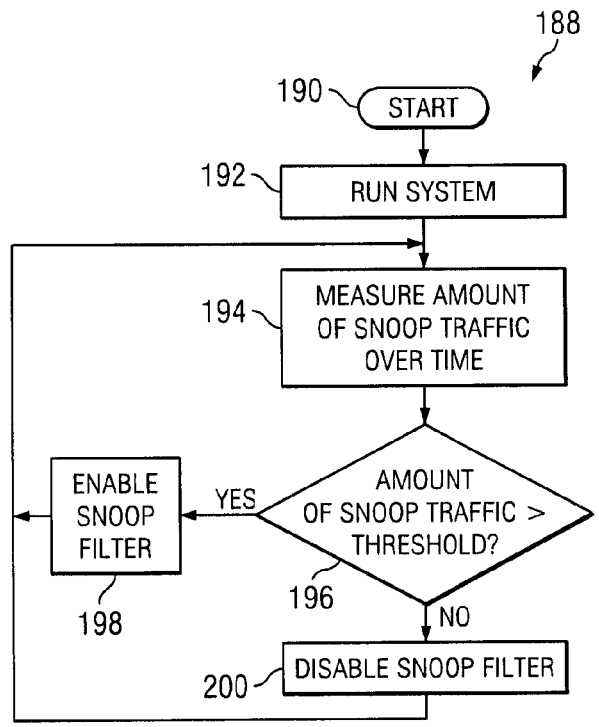
FIG. 7 is a flow chart illustrating an embodiment of an adaptive snoop filter method.

FIG. 7 is flow chart illustrating an embodiment of a adaptive snoop filter method 188. The method 188 starts at block 190. The method 188 then proceeds to block 192 when the IHS 100 is running. The method 188 then proceeds to block 194 where the method 188 measures an amount of snoop traffic over time. The method 188 then proceeds to decision block 196 where the method 188 determines whether the amount of snoop traffic is greater than a pre determined threshold amount of snoop traffic. If the method 188 determines that the amount of snoop traffic is greater than a pre determine threshold value, the method 188 proceeds to block 198 where the method 188 enables the snoop filter 140 operation and then the method 188 returns to block 194. If the method 188 determines that the amount of snoop traffic is not greater than a pre determine threshold value, the method 188 proceeds to block 200 where the method 188 disables the snoop filter 140 operation and then the method 188 returns to block 194. This adaptive method 188 may continue as long as the IHS 100 is running.

In an embodiment, another variable that determines the impact of the snoop filter 140 is the application or workload characteristics, as shown in FIG. 5. Applications that generate high front side bus 106 and memory bus 136 traffic benefit from reduced snoop activity by the snoop filter 140. Other applications incur a performance penalty due to back invalidate operations that are generated for an "inclusive" snoop filter 140 configuration. However, generally, workload characteristics cannot be determined at POST and can only be measured over time as the IHS 100 is being used to run the application or workloads (e.g., 153-156, and/or 161-165). In an embodiment, memory I/O hub chipset 104 and/or processor 102 counters may be used to measure the amount of snoop traffic over time. If it is observed that the system workload generates snoop operations over a certain threshold, a variable may be set which tells the BIOS to enable the snoop filter 140 during the next system reboot.

In an embodiment, if a memory I/O hub chipset 104 supports the option to toggle the snoop filter 140 operation without requiring a system reboot (e.g., Hyper Threading), then an adaptive process may be used to optimize performance based on workload characteristics. In this adaptive process, the snoop filter 140 may be either used or disabled based on both system configuration and workload characteristics. Depending on the snoop activity that is measured over time, the snoop filter 140 may be enabled or disabled without rebooting the IHS 100 to ensure optimal system performance. Thus, it should be apparent to one having ordinary skill in the art that many combinations of methods 170 and 188 may be used within the scope of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A snoop filter optimization system, comprising:
an information handling system (IHS) including a plurality of processors;
a snoop filter that is coupled to the plurality of processors through a bus; and
a snoop filter controller coupled to the snoop filter, wherein the snoop filter controller is operable to:
determine IHS configuration information and snoop filter configuration information in response to the IHS entering a self-inquiry mode;
access a table and use the IHS configuration information and snoop filter configuration information to determine system performance change information; and
in response to the system performance change information indicating that a system performance is improved due to operation of the snoop filter, enabling the snoop filter, and in response to the system performance change information indicating that a system performance is not improved due to operation of the snoop filter, disabling the snoop filter.

2. The system of claim 1, wherein each of the processors includes at least one processor cache, and the snoop filter is operable to determine and store the status of the at least one processor cache for each processor.

3. The system of claim 1, wherein the self-inquiry mode comprises a power on self test mode.

4. The system of claim 1, wherein the IHS configuration information and the snoop filter configuration information are one or more of a snoop filter size, a snoop filter inclusiveness, a processor memory, a processor bus speed, a processor cache size, and an amount of system memory.

5. The system of claim 1, wherein the self-inquiry mode comprises a basic input/output system (BIOS) operation.

6. The system of claim 1, wherein the bus comprises a front side bus.

7. The system of claim 1, wherein the IHS configuration information comprises a sum of a plurality of cache sizes of at least one processor cache for each processor and the snoop filter configuration information comprises a snoop filter size that is smaller than the sum of the plurality of caches sizes, and the snoop filter controller is operable to:
determine the system performance change information that indicates that the system performance is not improved due to operation of the snoop filter; and
disable the snoop filter.

8. A snoop filter optimization system, comprising:
an information handling system (IHS) including a plurality of processors;
a snoop filter that is coupled to the plurality of processors through a bus; and
a snoop filter controller coupled to the snoop filter, wherein the snoop filter controller is operable to:
determine an amount of snoop traffic over a period of time that results from a workload of the IHS;
compare the amount of snoop traffic determined over the period of time to a threshold amount; and
in response to determining that the amount of snoop traffic determined over the period of time exceeds the threshold amount, enable the snoop filter upon a reboot of the IHS.

9. The IHS of claim 8, wherein each of the processors includes at least one processor cache, and the snoop filter is operable to determine and store the status of the at least one processor cache for each processor.

10. The IHS of claim 8, wherein a processor counter is used to determine the amount of snoop traffic over the period of time.

11. The IHS of claim 8, wherein a chipset is used to measure the amount of snoop traffic over the period of time.

12. The IHS of claim 8, wherein, in response to determining that the amount of snoop traffic determined over the period of time exceeds the threshold amount, the snoop filter controller sets a variable that tells a basic input/output system (BIOS) of the IHS to enable the snoop filter upon the reboot of the IHS.

13. The IHS of claim 8, wherein the bus comprises a front side bus.

14. The IHS of claim 8, wherein the snoop filter controller is further operable to:
in response to determining that the amount of snoop traffic determined over the period of time does not exceed the threshold amount, disable the snoop filter upon a reboot of the IHS.

15. A method to optimize a snoop filter, comprising:
providing an information handling system (IHS) including a plurality of processors and a snoop filter that is coupled to the plurality of processors through a bus;
determining IHS configuration information and snoop filter configuration information, using a snoop filter controller that is coupled to the snoop filter, in response to the IHS entering a self-inquiry mode;
accessing a table with the snoop filter controller and using the snoop filter controller determine system performance change information using the IHS configuration information and snoop filter configuration information; and
in response to the system performance change information indicating that a system performance is improved due to operation of the snoop filter, enabling a snoop filter using the snoop filter controller, and in response to the system performance change information indicating that a system performance is not improved due to operation of the snoop filter, disabling the snoop filter using the snoop filter controller.

16. The method of claim 15, wherein each of a plurality of processors coupled to the snoop filter includes at least one processor cache, and the method further comprises:
determining and storing, by the snoop filter, the status of the at least one processor cache for each processor.

17. The method of claim 15, wherein the self-inquiry mode comprises a power on self test mode.

18. The method of claim 15, wherein the IHS configuration information and the snoop filter configuration information are one or more of a snoop filter size, a snoop filter inclusiveness, a processor memory, a processor bus speed, a processor cache size, and an amount of system memory.

19. The method of claim 18, wherein the self-inquiry mode comprises a basic input/output system (BIOS) operation.

20. The method of claim 15, wherein the IHS configuration information comprises a sum of a plurality of cache sizes of at least one processor cache for each of a plurality of processors coupled to the snoop filter, and the snoop filter configuration information comprises a snoop filter size that is smaller than the sum of the plurality of caches sizes, and the method further comprises:
determining that the system performance change information indicates that the system performance is not improved due to operation of the snoop filter; and
disabling the snoop filter.

21. A method to optimize a snoop filter, comprising:
determining IHS configuration information and snoop filter configuration information in response to an IHS entering a self-inquiry mode, wherein the IHS configuration information comprises a sum of a plurality of cache sizes of at least one processor cache for each of a plurality of processors coupled to a snoop filter, and the snoop filter configuration information comprises a snoop filter size that is smaller than the sum of the plurality of caches sizes;
accessing a table and using the IHS configuration information and snoop filter configuration information to determine system performance change information; and
in response to the system performance change information indicating that a system performance is not improved due to operation of the snoop filter, disabling the snoop filter.

* * * * *